United States Patent [19]
Agarwal et al.

[11] 3,753,064

[45] Aug. 14, 1973

[54] SYSTEM FOR CONTROLLING THE TORQUE OUTPUT OF AN INDUCTION MOTOR

[75] Inventors: Paul D. Agarwal; Richard W. Johnston, both of Troy; John G. Neuman, Grosse Pointe; Mark E. Preiser, Sterling Heights; Norman L. Traub, Troy; Thaddeus Schroeder, Sterling Heights, all of Mich.

[73] Assignee: General Motors Corporation, Detroit, Mich.

[22] Filed: Aug. 21, 1972

[21] Appl. No.: 282,132

[52] U.S. Cl. .................. 318/227, 318/230, 318/231
[51] Int. Cl. ............................................. H02p 5/40
[58] Field of Search ..................... 318/227, 230, 231

[56] References Cited
UNITED STATES PATENTS

| | | | |
|---|---|---|---|
| 3,500,158 | 3/1970 | Landau et al. | 318/227 |
| 3,512,067 | 5/1970 | Landau | 318/227 |
| 3,675,099 | 7/1972 | Johnston | 318/227 X |
| 3,700,988 | 10/1972 | Pryjmak | 318/227 |

*Primary Examiner*—Gene Z. Rubinson
*Attorney*—E. W. Christen and C. R. Meland et al.

[57] ABSTRACT

A motor control system for an induction motor which is capable of controlling the induction motor such that it operates with a predetermined torque-speed characteristic. The induction motor is operated with a predetermined constant slip frequency and the input voltage to the induction motor is varied to control the output torque and speed of the induction motor. The control system includes a closed loop feedback arrangement for controlling the output torque and speed of the induction motor such that the motor simulates the torque-speed characteristic of an internal combustion engine. Since the induction motor can be controlled to simulate the torque-speed characteristic of an internal combustion engine it can be used as a power source for driving an automatic transmission in a test setup for testing automatic transmissions. The control system includes means for sensing the actual output speed of the induction motor and the actual output torque of the induction motor. An electrical signal which is a function of induction motor output speed is applied to a function generator and the output of this function generator determines the desired output torque of the induction motor. The function generator is an active low pass filter and is designed to simulate various internal combustion engine torque-speed characteristics for various throttle settings for a given internal combustion engine.

5 Claims, 6 Drawing Figures

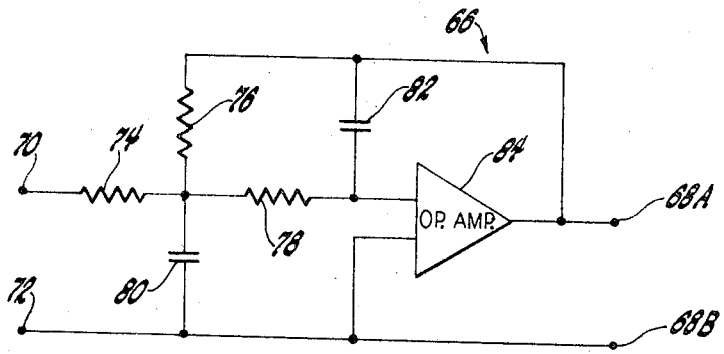
Fig. 3
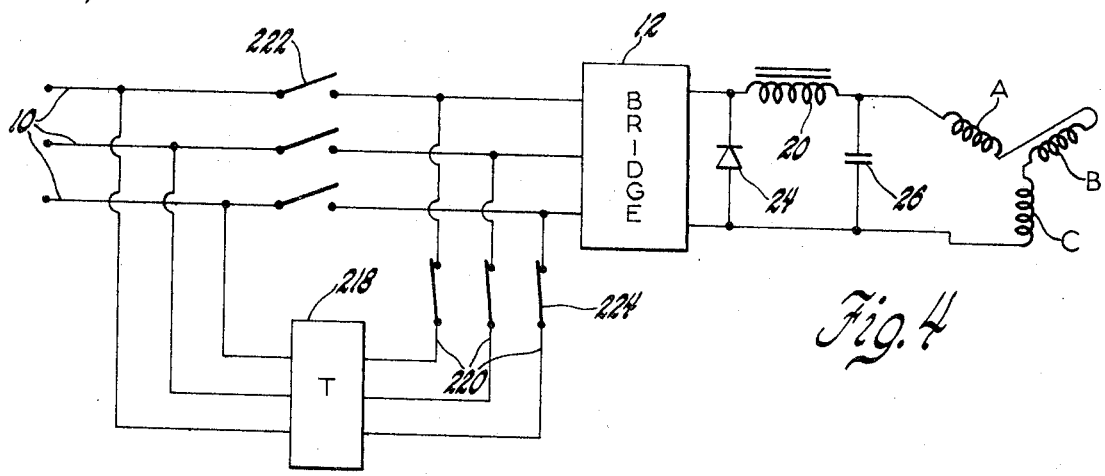
Fig. 4
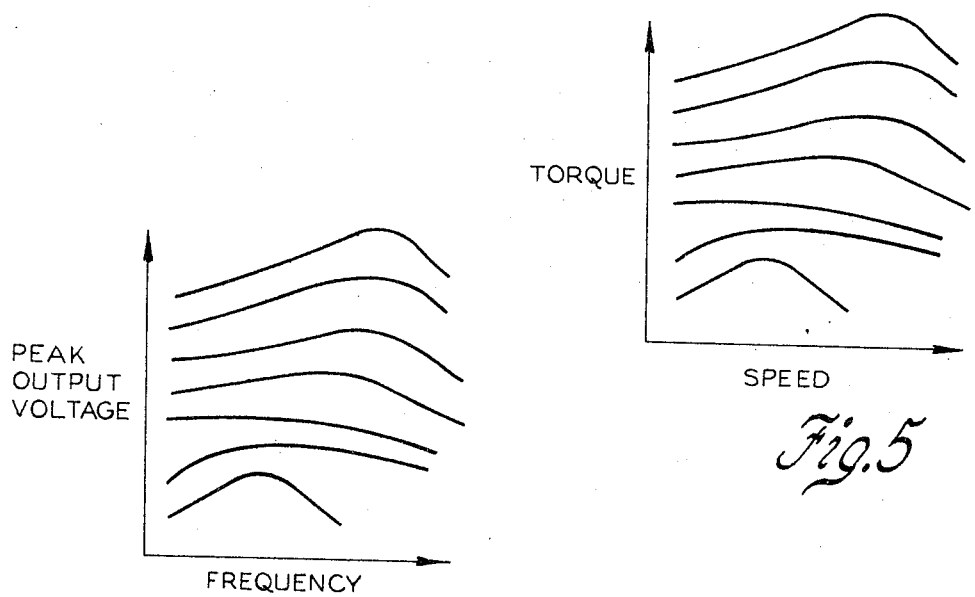
Fig. 6
Fig. 5

SYSTEM FOR CONTROLLING THE TORQUE OUTPUT OF AN INDUCTION MOTOR

This invention relates to a motor control system and more particularly to a motor control system for an induction motor which is capable of controlling the induction motor such that the motor develops a predetermined torque-speed characteristic. This torque-speed characteristic can be controlled such that it simulates the torque-speed characteristic of a given internal combustion engine for various throttle settings of this engine. Because of this capability the motor control system of this invention is useful in testing motor vehicle automatic transmissions since a predetermined torque-speed can be imposed upon the input of the automatic transmission thereby subjecting the automatic transmission to the various simulated operating conditions of an internal combustion engine.

One method of testing the present day automatic transmissions is to couple the automatic transmission with an internal combustion engine and then operate the internal combustion engine over various speed ranges and torques which will be encountered by the automatic transmission in actual use on a motor vehicle. Since the automatic transmission may be coupled with many types of engines having different torque-speed characteristics it is difficult to test the transmission when only one type of engine is available. In addition, it is not possible to obtain highly repeatable operation with a gasoline internal combustion engine since the fuel-air mixture cannot be controlled accurately from one run to the next.

It accordingly is one of the objects of this invention to provide a motor control system for an electric motor where the torque and output speed of the electric motor simulates the torque-speed characteristic of an internal combustion engine. More particularly this invention contemplates programming the torque-speed characteristic of an induction motor such that its output simulates that of an internal combustion engine. Since the induction motor has an inertia which is comparable to the inertia of an internal combustion engine it is ideally suited for simulating the torque and output speed of an internal combustion engine. This is not true of all electric motors, for example a 400 horsepower DC motor has an inertia that is many times that of an internal combustion engine and is therefore not suited for this application. In addition, the induction motor can be made to have the necessary combination of low inertia and high torque capability plus its advantage of extremely rugged design and requirement of minimum maintenance.

In simulating the torque-speed characteristics of an internal combustion engine the motor control system for the induction motor includes a closed loop system which is capable of sensing the actual torque output of the induction motor and comparing this torque output with a desired torque. When a torque error signal is detected the input voltage to the induction motor is varied. Since the motor is operated in a constant slip frequency mode the desired torque for the motor will be brought about by varying the motor input voltage.

Although closed loop torque control systems for induction motors are known in the art, for example see the U.S. Pat. to Biringer No. 3,127,547, the present invention differs from the disclosure of this patent in that the control system of the present invention applies a motor speed signal to a function generator which develops a desired output torque signal that simulates the desired speed-torque characteristic of a given internal combustion engine. The output torque signal of the function generator is compared against the actual output torque of the induction motor and the input voltage of the induction motor is varied according to an error signal to provide the desired torque-speed characteristic for the induction motor. In carrying this object forward the function generator is comprised of a second order low pass filter which has an alternating voltage applied thereto the frequency of which is a function of the output speed of the induction motor. By proper design of the filter the output voltage of the filter will simulate the torque-speed characteristic of a given internal combustion engine and therefore will provide a torque signal to be compared with the actual torque output of the induction motor. By providing different filters which simulate different internal combustion engines the control system is capable of simulating various internal combustion engines and various throttle settings for a given internal combustion engine. This means that the automatic transmission can be in effect connected with various types of internal combustion engines by simply changing the characteristics of the function generator which control the induction motor.

In the drawings:

FIG. 3 is a schematic circuit diagram of an active filter function generator utilized in the combination shown in FIG. 1;

FIG. 4 is an electrical circuit diagram of an arrangement for braking the induction motor illustrated in FIG. 1;

FIG. 5 illustrates curves of typical torque-speed characteristics of an internal combustion engine; and FIG. 6 illustrates curves of input frequency and peak output voltage of the function generator illustrated in FIGS. 1 and 3.

Figure 1:
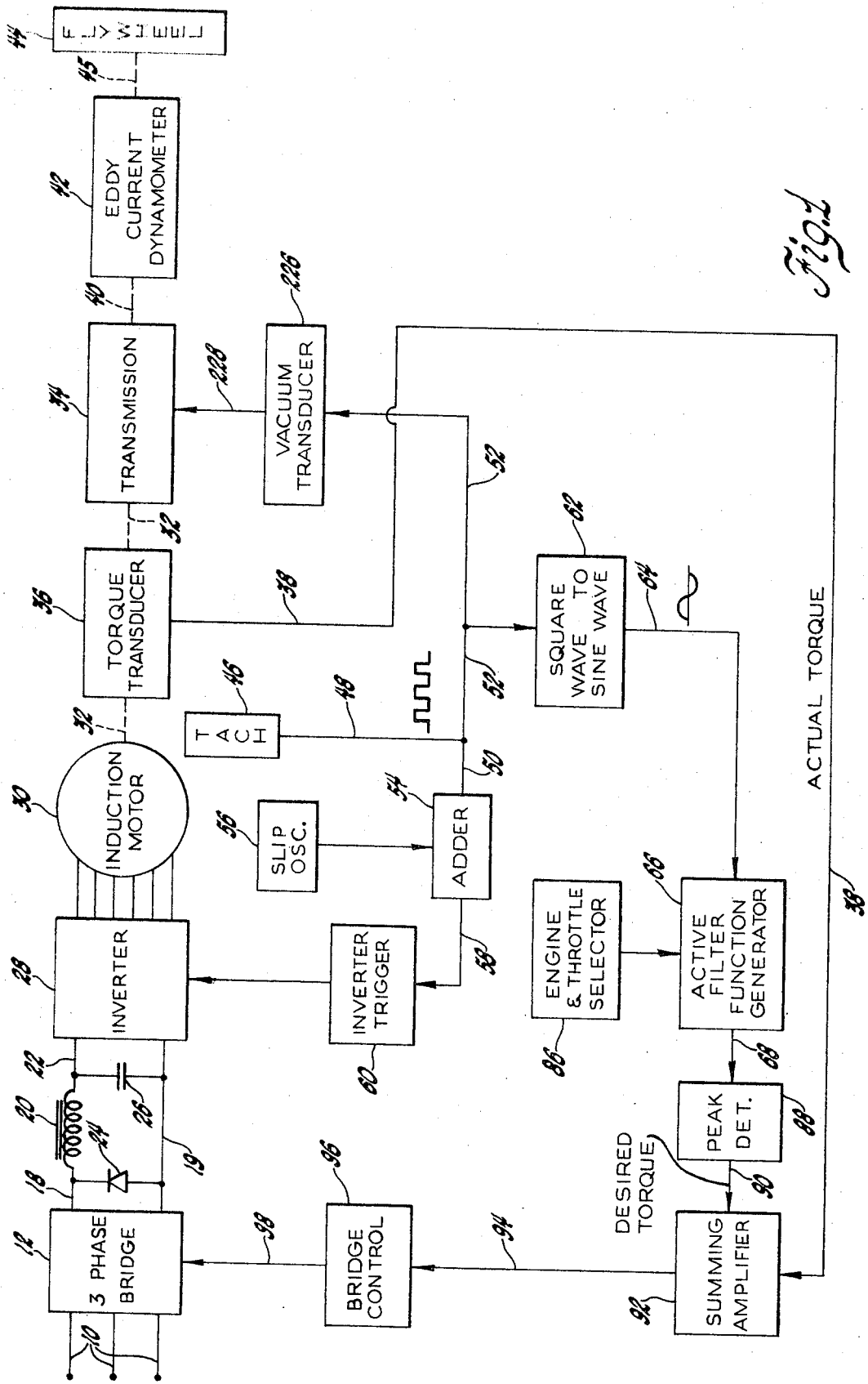
FIG. 1 is a schematic block diagram of a motor control system made in accordance with this invention.

Referring now to the drawings and more particularly to FIG. 1 a system is illustrated for testing an automatic transmission. The reference numeral 10 designates three power input conductors which are adapted to be connected with a 480 volt three-phase 60 cycle power supply. The conductors 10 are connected with a three-phase bridge rectifier designated by reference numeral 12 which includes three diodes 14 and three controlled rectifiers 16 illustrated in FIG. 2. The bridge rectifier 12 converts the 480 volt alternating current input to a controllable direct current voltage which is applied to conductors 18 and 19. The conductor 18 is connected in series with an inductor 20 which in turn is connected to a direct current power supply conductor designated by reference numeral 22. A freewheeling diode 24 is connected across conductors 18 and 19 and a filter capacitor designated by reference numeral 26 is connected across conductors 19 and 22. As will become more apparent hereinafter the direct voltage appearing across conductors 19 and 22 is controlled by the motor control system of this invention and this is accomplished by controlling the firing angle of controlled rectifiers 16.

Figure 2:
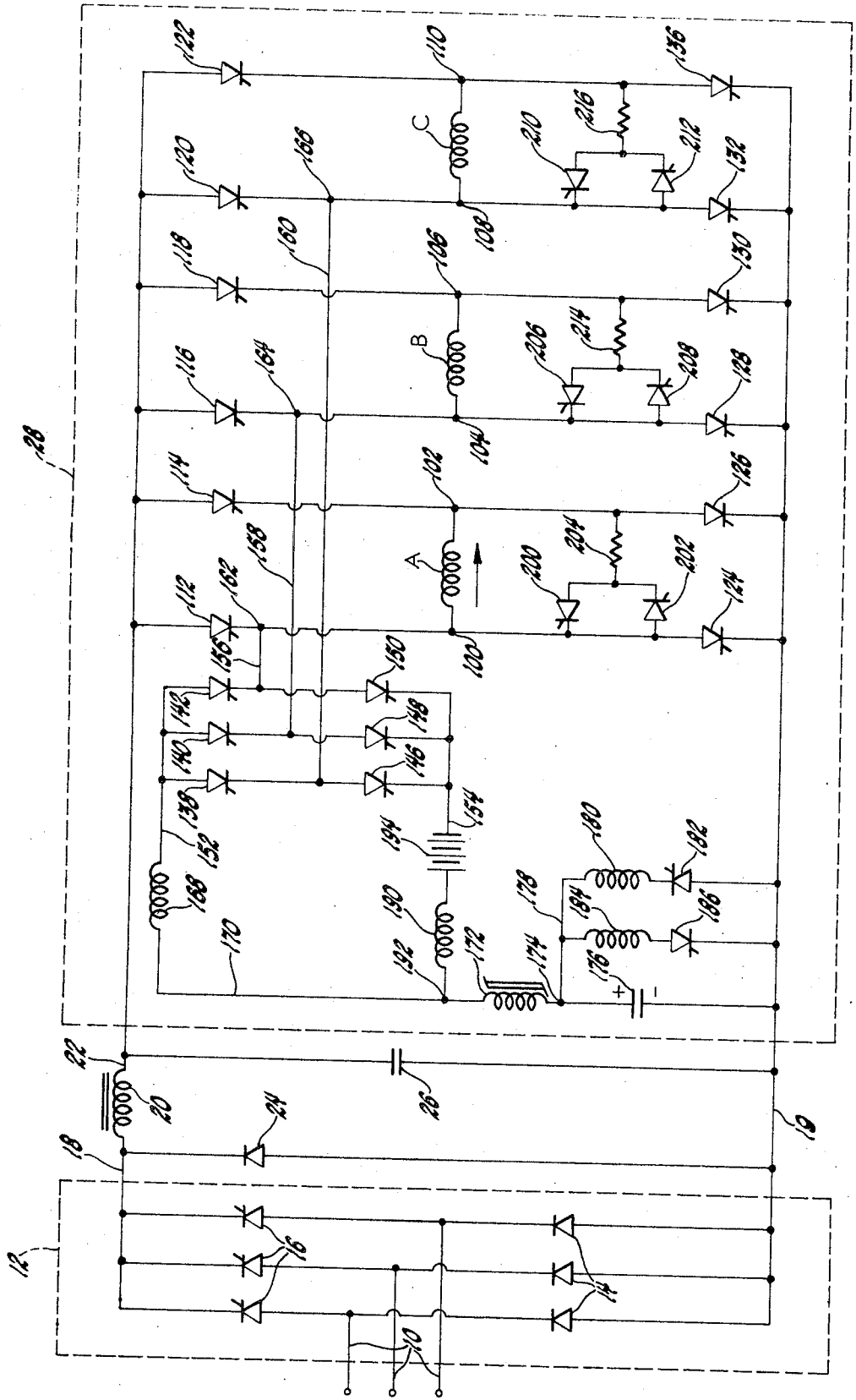
FIG. 2 is a schematic circuit diagram of a bridge rectifier power supply and inverter utilized in the system of FIG. 1.

The direct voltage appearing across conductors 19 and 22 is applied to a polyphase inverter designated by reference numeral 28 and shown in detail in FIG. 2. The inverter 28 converts the direct voltage at input conductors 19 and 22 to a three-phase square wave alternating voltage which is applied to an induction motor generally designated by reference numeral 30. The induction motor 30 has phase windings designated A, B and C illustrated in FIG. 2 which are wound on a stator to provide a three-phase winding. This induction motor has a squirrel cage rotor which is coupled to an output shaft designated by reference numeral 32 and illustrated in dotted lines in FIG. 1. By way of example and not by way of limitation the induction motor 30 can be a three-phase four pole squirrel cage motor having a maximum speed of 6,000 rpm. The maximum torque of the motor is approximately 485 lb.-ft. The moment of inertia of the motor is approximately 1.8 inch-lb.-second squared. As will be described hereinafter the motor is preferably operated at a constant slip frequency of five cycles per second.

The output shaft 32 of the induction motor 30 is coupled to an automatic transmission designated by reference numeral 34 which is driven by the motor control system of this invention during testing of the transmission. The transmission 34 is of the automatic type utilized on motor vehicles to automatically shift the speed ratio between an internal combustion engine of a motor vehicle and the drive wheels. Typical examples of automatic transmissions that may be tested by the system of this invention are illustrated in the U.S. Pats. to Winchell et al., Nos. 3,321,056 and Van Lent et al., 3,541,887. These transmissions are of the automatic type which respond to input speed and a vacuum signal to automatically shift the transmission during acceleration and deceleration of a motor vehicle.

A torque transducer designated by reference numeral 36 is connected with the output shaft 32 of the induction motor 30. The torque transducer 36 provides an electrical signal which is a function of the output torque of the induction motor 30. Although the torque transducer 36 may take various known configurations for providing an output electrical signal on conductor 38 which is a function of the output torque on shaft 32, this transducer preferably utilizes an in-line torque sensor Himmelstein model MCRT-6-02T-6-3. This transducer uses a rotating transformer device and is capable of measuring torques up to 500 lb.-ft. A Daytronic Indicator-Amplifier unit, model 300D with a type 91 input module and a type P output module produces the carrier signal and the demodulation for the operation of the torque sensor. The output voltage of the Daytronic unit is scaled to produce 1 volt direct voltage per 50 lb.-ft. of torque and this electrical signal is applied to conductor 38.

It will be appreciated that the direct voltage applied to conductor 38 is a function of the actual torque output of the induction motor 30 and is so indicated in FIG. 1.

The output shaft of the automatic transmission 34 is designated by reference numeral 40 and indicated by a dotted line in FIG. 1. This output shaft 40 is connected with an eddy current dynamometer designated by reference numeral 42 and the output of the eddy current dynamometer is connected to a flywheel designated by reference numeral 44 by a shaft 45. The purpose of the flywheel 44 and the dynamometer 42 are to simulate the load torque of any vehicle weighing, for example, between 3,600 and 6,000 pounds. The size of the flywheel is determined by the inertia of the smallest vehicle to be simulated, and the dynamometer is chosen to provide additional inertia load when simulating larger vehicles. The eddy current dynamometer is connected with suitable controls (not illustrated) and can provide a constant torque and torques proportional to speed and speed squared thus allowing complete road load simulation for the transmission 34.

During the operation of the induction motor 30, the motor is operated at a constant slip frequency of approximately five cycles per second. The torque output of the motor is controlled by varying voltage applied to the inverter 28. This gives the overall system the characteristics of a DC series motor while retaining the advantages inherent in a polyphase induction motor system.

In order to control the slip frequency of the induction motor to maintain it constant the control system of this invention utilizes a tachometer designated by reference numeral 46. The tachometer 46 senses the speed of rotation of the shaft 32 and may take various forms which will apply an electrical signal to conductor 48 which is a function of the speed of rotation of shaft 32. By way of example, the shaft 32 may be fitted with a toothed wheel which is not illustrated and this wheel interposed between a light emitting diode and a photo transistor. With this arrangement a square wave voltage having a frequency which is a function of shaft speed is applied to the conductor 48.

The conductor 48 is connected with conductors 50 and 52. The conductor 50 is connected with an adder designated by reference numeral 54. A slip frequency oscillator designated by reference numeral 56 is also connected with the adder 54. The slip frequency oscillator 56 can take the form of a square wave generator generating a series of pulses the frequency of which determines the slip frequency of the induction motor. The adder 54 adds the pulses from tachometer 46 which are a function of the actual speed of the induction motor to the output frequency of the slip frequency oscillator 56 and applies this output to a conductor 58. The output pulse frequency of the tachometer 46 and slip frequency oscillator 56 are multiples of the desired frequencies that represent motor speed and slip frequency and the system includes conventional divider circuitry (not illustrated) for applying the correct divided down pulse frequency to the inverter trigger. The frequency of the pulses applied on conductor 58 will be a function of the actual rotor speed of the induction motor 30 added to a predetermined slip frequency determined by the output frequency of the slip frequency oscillator 56. These pulses are applied to an inverter trigger circuit designated by reference numeral 60 and the output of this trigger circuit is coupled to the controlled rectifiers in the inverter 28 to determine the switching frequency of the inverter 28. With this arrangement the switching frequency of the inverter 28 determines the input frequency of the induction motor and the arrangement is such that the induction motor operates at a constant slip frequency (five cycles per second) determined by the output frequency of the slip frequency oscillator 56. Various other arrangements for controlling the slip frequency of an induction motor are disclosed in the U.S. Pat. to Agarwal et al., No. 3,323,032 and the system disclosed therein can be utilized to control the slip frequency of the induction motor of this invention.

The square wave pulses applied to conductor 52 which have a frequency determined by the actual speed of the rotor of the induction motor 30 are applied to conductor 52 and to a square wave to sine wave converter designated by reference numeral 62. The square wave to sine wave converter designated by reference numeral 62 can take various forms but preferably is of the type disclosed in the U.S. Pat. to Neuman No. 3,644,847. The output of the converter 62 is a sine wave having a substantially constant amplitude and a frequency which is proportional to the rotor speed of the induction motor 32. This output is applied to the conductor 64 which in turn is connected with a function generator designated by reference numeral 66.

The purpose of the function generator 66 is to provide an electrical signal on conductor 68 which simulates the torque-speed characteristics of an internal combustion engine. Thus, it is desired that the electrical signal on conductor 68 be related to the torque-speed characteristics of an internal combustion engine as are depicted in FIG. 5 for various throttle settings of the engine. In order to accomplish this the function generator 66 takes the form of a second order, low pass filter illustrated in FIG. 3.

This filter, as shown in FIG. 3, has a pair of input terminals designated by reference numerals 70 and 72 which receive the sine wave output of the converter 62. The filter of FIG. 3 includes resistors 74, 76, 78 and capacitors 80 and 82 all of which are connected as illustrated. The filter further includes an operational amplifier designated by reference numeral 84 and the output of the filter is designated by terminals 68A and 68B which correspond to the conductor 68 illustrated in FIG. 1. By properly selecting the values of the resistors and capacitors of the filter shown in FIG. 3 the filter will exhibit the gain-frequency response curves shown in FIG. 6 which closely resemble the torque-speed curves of a given internal combustion engine. It will of course be appreciated by those skilled in the art that the filter circuit in FIG. 3 will only produce one of the seven curves illustrated in FIG. 6. These seven curves of FIGS. 5 and 6 correspond to seven different throttle settings for a given internal combustion engine. In order to properly control the system of this invention the filters are formed on printed circuit cards and a given filter is connected into the system to provide a given gain-frequency response characteristic and therefore simulate a given throttle setting for a given engine. In order to accomplish this the system is provided with an engine and throttle selector 86, which is shown in block diagram form in FIG. 1. This selector includes a series of push buttons which are electrically connected with relays or other devices for switching in the printed circuit cards that contain the circuits for the filters or function generators designated by reference numeral 66. Thus the engine throttle and selector 86 may include suitable push buttons or other switching devices for connecting in a printed circuit card which represents a given internal combustion engine and having for example seven different throttle settings on a given printed circuit card. A given throttle setting may then be selected which switches in a given filter circuit or function generator circuit to provide a given gain-frequency curve as illustrated in FIG. 6. This means that the operator of the transmission testing device may selectively connect in a printed circuit card representing a given internal combustion engine and then may switch in a given filter or function generator to provide a predetermined gain-frequency response for the filter representing a predetermined torque-speed curve for the internal combustion engine.

The signal developed on conductor 68 will be a sine wave and is applied to peak detector designated by reference numeral 88. The output of this peak detector is applied to a conductor 90. The electrical signal on conductor 90 is a direct voltage which represents the desired torque of the system for a given torque-speed characteristic. The conductor 90 is connected to a conventional summing amplifier which is designated by reference numeral 92. The summing amplifier has another input from conductor 38 which is a direct voltage representing the actual torque output of the induction motor 32. The summing amplifier 92 compares the voltages on conductors 90 and 38 and applies an error signal to conductor 94 which in turn is applied to a bridge control circuit designated by reference numeral 96. The output of the bridge control circuit 96 is applied to a conductor 98 which is connected with controlled rectifiers 16 of the bridge control circuit 12 to control the firing angle of the controlled rectifiers 16. The bridge control circuit 96 and its connection with the controlled rectifiers can take the form of the system illustrated in U.S. Pat. application Ser. No. 198,545, filed in the name of Thaddeus Schroeder on Nov. 15, 1971 and assigned to the assignee of this invention.

It will be appreciated by those skilled in the art that when the signal on conductor 90, as compared to the signal on conductor 38, is such that the actual torque developed on shaft 32 of induction motor 30 is lower than the desired torque as determined by the electrical signal on conductor 90, the output of the bridge 12 will be increased to increase the torque output of induction motor 30. On the other hand where the output torque of the induction motor 30 is higher than that desired as determined by the electrical signal on conductor 90 the output voltage of the bridge 12 will be reduced to reduce the torque output of the induction motor 30. In this manner the output of the induction motor is controlled to follow a predetermined torque-speed characteristic of a simulated internal combustion engine and the system will follow the various torque-speed characteristics as illustrated in FIG. 5 depending upon the throttle setting that has been selected by the engine and throttle selector 86. It should be kept in mind that torque control is possible because the slip frequency of the induction motor is being maintained at a constant value by the system that has been described.

Referring now more particularly to FIG. 2, the inverter 28 is disclosed in detail which feeds the induction motor 30. The phase windings of the induction motor 30 are designated A, B and C in FIG. 2 and the ends of these phase windings are connected with junctions 100, 102, 104, 106, 108 and 110 located between pairs of controlled rectifiers. The power controlled rectifiers for the inverter which feed current to the phase windings are designated by reference numerals 112–136. It is seen that the inverter utilizes 12 controlled rectifiers 112, 114 – 132 and 136 with six of the controlled rectifiers 112–122 having their anodes connected to the positive power line 22. The cathodes of controlled rectifiers 124–136 are all connected to the negative power line 19.

The controlled rectifiers are switched in a predetermined sequence to provide for 120° square wave energization of the phase windings for example as shown in FIG. 6 of the U.S. Pat. to Agarwal et al., No. 3,323,032. In order to accomplish this, pairs of controlled rectifiers are gated conductive over predetermined conduction periods. For example, when controlled rectifiers 112 and 126 are gated conductive it will be apparent that phase winding A will be energized from positive conductor 22, through conductive controlled recitifer 112 to junction 100, through phase winding A from junctions 100 to 102 and then through conductive controlled rectifier 126 to negative power line 19. This may be thought of as applying a positive voltage to phase winding A for the period of time that controlled rectifiers 112 and 126 are conductive. A negative voltage, or in other words a current flow through phase winding A in a direction opposite to that indicated by the arrow can be provided by gating controlled rectifiers 114 and 124 simultaneously conductive. Current will now flow through these two controlled rectifiers and from junction 102 to junction 100 during the period of time that these two controlled rectifiers are gated conductive.

By suitably gating controlled rectifiers 116 and 130 phase winding B will be supplied with current and this current can be reversed by simultaneously gating controlled rectifiers 118 and 128 conductive. In a similar fasion phase winding C will be supplied with current in a positive sense when controlled rectifiers 120 and 136 are conductive and in an opposite or negative sense when controlled rectifiers 122 and 132 are gated conductive.

The controlled rectifiers are gated conductive by control circuitry designated by reference numeral 60 and are gated in a three-phase sequence to supply the phase windings with 120° square wave voltages as illustrated in the above mentioned Agarwal et al. patent. The logic for controlling the switching of controlled rectifiers 112–136 can be like that disclosed in the U.S. Pat. to Johnston et al., No. 3,611,090 granted on Oct. 5, 1971. It will, of course, be appreciated that the controlled rectifiers of the inverter 28 are switched at a frequency which is a function of the signal on conductor 58 of FIG. 1 to therefore maintain a constant slip frequency for the induction motor 30.

Since the power controlled rectifiers of the inverter are connected with a direct current input the system must include an arrangement for commutating or turning off a given controlled rectifier when a conduction period for a given phase winding of the motor is to be terminated. To this end the inverter 28 includes six shut-off controlled rectifiers 138, 140, 142, 146, 148 and 150. The anodes of controlled rectifiers 138–142 are connected with conductor 152 while the cathodes of controlled rectifiers 146–150 are connected with a conductor 154. The junctions between a pair of shut-off controlled rectifiers are respectively connected with conductors 156, 158 and 160 which in turn are connected with junctions 162, 164 and 166.

The conductor 152 is connected in serires with an inductor 168 the opposite side of which is connected with conductor 170. The conductor 170 is connected in series with saturable reactor 172, junction 174 and a commutating capacitor 176. The junction 174 is connected with conductor 178. An inductor 180 and controlled rectifier 182 are series connected between conductor 178 and conductor 19 as are inductor 184 and controlled rectifier 186. Another inductor 190 is connected between junction 192 and a source of shut-off direct voltage designated by reference numeral 194.

When it is desired to turn-off or commutate a conducting power controlled rectifier one of the shut-off controlled rectifiers is gated conductive. For example, assume it is desired to shut-off the controlled rectifiers 112 and 126. In order to accomplish this, controlled rectifier 142 is gated conductive. This sets up a discharge path for capacitor 176 which has been previously charged with a polarity indicated in FIG. 2. The discharge path is through saturable reactor 172, inductor 168 and conducting controlled rectifier 142 to junction 162. By gating controlled rectifier 142 conductive the discharge path for capacitor 176 raises the voltage of junction 162 to such a value as to shut-off controlled rectifier 112. When controlled rectifier 112 shuts off the polarity of the voltage of capacitor 176 will be reversed. Thus, when controlled rectifier 142 has been gated conductive to shut-off controlled rectifier 112 the capacitor 176 will discharge in a manner described above to place a positive potential on junction 162. As current flow to phase winding A is reduced the voltage reverses across phase winding A tending to maintain current in the same direction indicated by the arrow in FIG. 2. This action will cause the capacitor 176 to be charged with a polarity opposite to that shown in FIG. 2 through a circuit that can be traced from junction 102, controlled rectifier 126, capacitor 176, saturable reactor 172, inductor 168 and controlled rectifier 142. When the capacitor 176 becomes charged controlled rectifier 126 shuts off due to lack of holding current. It will be observed that the gating of controlled rectifier 142 conductive results in the shutting off of both controlled rectifiers 112 and 126. In a similar fashion other pairs of controlled rectifiers of the inverter are shut-off when controlled rectifiers 138 and 140 are gated conductive.

When it is desired to shut-off one of the controlled rectifiers 124, 128 and 132 one of the controlled rectifiers 146–150 is gated conductive. Assume that it is desired to shut-off controlled rectifier 124 at the end of the conduction period of controlled rectifiers 114 and 124. This is accomplished by gating controlled rectifier 150 conductive. When this occurs a current path exists from conductor 154, direct voltage source 194, inductor 190, saturable reactor 172, capacitor 176, conductor 19, capacitor 26, conductor 22, controlled rectifier 114, junction 102, phase winding A, junction 100 and conductor 156 to the anode of controlled rectifier 150.

When a controlled rectifier 124 is turned off the capacitor again will have its charge reversed back to the polarity indicated in FIG. 2. Thus, assuming controlled rectifiers 114 and 124 are previously conductive the current flow for power operation will be opposite to that illustrated by the arrow in FIG. 2. If controlled rectifier 124 is now turned off current will tend to be maintained in the direction of junction 102 to junction 100. This will recharge the capacitor through a circuit from junction 100 through controlled rectifier 150, through shut-off power source 194, through inductor 190, through saturable reactor 172, through capacitor 176, capacitor 26, power supply conductor 22 and controlled rectifier 114. This will result in the turning off of controlled rectifier 114. The arrangement that has been described is disclosed and claimed in U.S. Pat. application Ser. No. 175,135, filed in the name of Mark E. Preiser on Aug. 26, 1971 and assigned to the assignee of this invention.

The purpose of the inductors 180 and 184 and controlled rectifiers 182 and 186 is to control the ring time of the inverter circuit including the various inductances and capacitor 176. It can be seen that when either controlled rectifier 182 or 186 is turned on an inductance is connected in parallel with the commutating capacitor 176 resulting in a lower net inductance for the system and consequently a lower ring time. This feature of the inverter is disclosed and claimed in the U.S. Pat. application Ser. No. 175,136, filed in the name of Richard W. Johnston on Aug. 26, 1971 and assigned to the assignee of this invention.

The purpose of the saturable reactor 172 is to reduce heating in the shut-off controlled rectifiers 138–142 and 146–150 during turn on of the high current pulses. The inductors 168 and 190 limit the rate of change of current applied to the shut-off controlled rectifiers after the reactor 172 has saturated.

It is seen in FIG. 2 that the phase winding A is paralleled by back-to-back connected controlled rectifiers 200 and 202 which are connected in series with resistor 204. Similar circuit arrangements for phase windings B and C comprise controlled rectifiers 206, 208, 210 and 212 and resistors 214 and 216. The use of these controlled rectifiers and resistors is optional depending upon the amount of reactive energy that is returned to the commutating capacitor during operation of the system. Where this reactive energy is large, for example at high torque operation, the resistor will dissipate some of the reactive energy developed in a given motor phase winding and the voltage applied to the commutating capacitor is maintained at a safe value. Thus, when one of the two controlled rectifiers is switched on a current path will exist though a resistor to dissipate some of this energy. As an example, when controlled rectifier 112 is turned off current will be maintained in phase winding A in the direction of the arrow shown in FIG. 2 and controlled rectifier 200 will then be switched on to provide a path for dissipating some of the reactive energy of phase winding A in resistor 204. The switching of these controlled rectifiers is controlled by the inverter trigger circuit designated by reference numeral 60 in FIG. 1.

The switching of the controlled rectifiers that make up the inverter 28 are controlled by conventional logic circuitry which is identified by reference numeral 60 in FIG. 1. This circuitry can be of the type shown in the above mentioned U.S. Pat. No. 3,611,090 to Johnston and can also take the form disclosed in the above-identified U.S. Pat. applications Ser. No. 175,136 and Ser. No. 175,135.

Summarizing the operation of the inverter 28 it will be appreciated that this inverter applies a variable frequency square wave voltage to the phase windings, A, B and C of motor 30 and this frequency is determined by the constant slip frequency control system illustrated in FIG. 1. The amplitude or magnitude of the voltage applied to the phase windings of motor 30 is controlled by controlling the firing angle of controlled rectifiers 16 of the bridge circuit 12.

The control system of this invention is capable of braking the induction motor 30 to simulate compression braking of an internal combustion engine. The braking circuit is illustrated in FIG. 4. This circuit includes a conventional three-phase stepdown transformer 218 having its input connected to the power supply conductors 10. The output of transformer 218 is applied to conductors 220 and the transformer ratio is such that approximately 37 volts is applied to conductors 220 from the input conductors 10 which have 480 volts applied thereto. The braking system further includes three switch contacts generally designated by reference numeral 222 and another group of switch contacts designated by reference numeral 224. When it is desired to operate the induction motor in a braking mode the contacts 222 are automatically opened and the contacts 24 automatically closed by a conventional relay system that is not illustrated. This disconnects the bridge 12 from the 480 volt input and connects the input of the bridge to the 37 volt output of the transformer 218. The output of the bridge rectifier 12 is now considerably reduced and the direct current output of this bridge rectifier is applied to phase windings A, B and C connected in series. The contactors for connecting the phase windings A, B and C in series and across the output of bridge 12 are not illustrated but can take any conventional form, for example a group of electromagnetically operated contacts which are operated at the same time as contacts 222 and 224. It is known that when direct current is applied to the phase windings of an induction motor the motor will exhibit a braking action and this is accomplished by the circuit shown in FIG. 4. During the time that the motor is being braked the trigger signals are removed from the controlled rectifiers of inverter 29 so that the inverter 28 no longer supplies power to the motor. The reduction in voltage when operating in a braking mode from 480 volts to 37 volts minimizes the pulse currents and heating of the diodes 14 and controlled rectifiers 16 which make up the bridge 12.

The control of the braking operation can be accommodated by suitable printed circuit control cards which switch the system to a braking mode at certain output speed conditions of the induction motor and during certain simulated throttle settings for the induction motor.

FIGS. 5 and 6 have been previously referred to and as explained above FIG. 5 illustrates seven torque-speed curves representing seven different throttle settings for a given internal combustion engine. FIG. 6 is a plot of the gain-frequency output of the second order low pass filter shown in FIG. 3 which operates as a function generator for the system. It is seen that there are seven output voltage-frequency curves which correspond respectively to seven torque-speed curves for an engine. As explained above the engine and throttle selector 86 switches in various printed circuit cards for a given engine and each printed circuit represents given components for a low pass filter to provide the curves shown in FIG. 6. In other words, seven low pass filters are required on a printed circuit card to provide the seven curves illustrated in FIG. 6 and these filters are individually switched into the circuit to provide a given throttle setting. Each filter will take the form shown in FIG. 3 but will have different characteristics to provide the proper response.

Since the automatic transmission 34 requires a vacuum signal for operation and since this transmission is being driven by an induction motor rather than by an internal combustion engine the system includes means for simulating a vacuum signal corresponding to induction motor speed and throttle position. This is accomplished by a vacuum transducer designated by reference numeral 226 which has a vacuum line 228 connected to the vacuum input of the transmission 34. This vacuum transducer can take various forms but is arranged such that an electrical speed signal applied thereto controls a valve which mixes air pressure and vacuum provided by pumps which are not illustrated. This mixing produces a vacuum on line 228 which is a function of induction motor speed and throttle position and simulates the vacuum that would be produced by an internal combustion engine were the engine driving the transmission. This vacuum transcucer system preferably includes a function generator which is not illustrated and there is a separate function generator for each throttle position of the engine. Where the system is used in a plant the plant air pressure can be controllably mixed with the output of a vacuum pump to produce the controlled vacuum output.

What is claimed is:

1. A motor control system for an induction motor for causing the motor to operate with a predetermined torque-speed characteristic comprising, an induction motor having a winding, a variable output frequency control circuit comprised of a plurality of switching devices having an output connected with said winding and operable to provide said winding with a variable frequency alternating voltage, a source of voltage connected to the input of aid control circuit, means responsive to actual motor speed and coupled to said control circuit for causing said motor to operate with a predetermined constant slip frequency, a voltage control means for said system operative to control the magnitude of the voltage applied to said motor winding, means for developing an alternating voltage the frequency of which is a function of actual motor speed, function generator means having an output voltage-frequency characteristic which corresponds to a desired predetermined torque-speed characteristic for said motor, means for applying said alternating voltage representing actual motor speed to the input of said function generator means, means for developing a torque signal which is a function of the actual output torque of said motor, means for comparing said torque signal and a signal which is a function of the output of said function generator means to produce a control signal, and means applying said control signal to said voltage control means to thereby control the magnitude of the voltage applied to said motor winding as a function of said voltage control signal.

2. An induction motor drive system having a predetermined torque-speed characteristic comprising, an induction motor having a winding, a source of alternating current, a controlled rectifier connected to said source of alternating current effective to rectify the voltage of said source and produce a direct voltage having a magnitude determined by the firing angle of said controlled rectifier, an inverter connected to said controlled rectifier and responsive to said direct voltage to produce an alternating voltage the magnitude of which is a function of the firing angle of said controlled rectifier, means coupling the output of said inverter to said winding of said induction motor, means responsive to actual motor speed to control the frequency of the inverter output voltage so as to provide a constant slip frequency for said induction motor, means responsive to actual motor speed to produce an alternating voltage the frequency of which is a function of actual motor speed, a filter having output voltage-frequency characteristic corresponding to a desired torque-speed characteristic for said motor, means for applying said alternating voltage representing actual motor speed to the input of said filter, means for developing a voltage which is a function of the torque output of said motor, and means responsive to a comparison of said torque related voltage and a voltage which is a function of the output voltage of said filter for controlling the firing angle of said controlled rectifier.

3. A motor control system for an induction motor for causing the motor to operate with a predetermined torque-speed characteristic which simulates the torque-speed characteristic of an internal combustion engine comprising, an induction motor having a winding, a source of voltage, frequency control means connected between said source of voltage and said motor winding for determining the frequency of an alternating voltage applied to said motor winding from the output of said frequency control means, means responsive to actual motor speed coupled to said frequency control means for controlling the output frequency of said frequency control means to cause said motor to operate at a substantially constant slip frequency, a voltage control means for said system operative to control the magnitude of the voltage applied to said motor winding, means for developing an alternating voltage the frequency of which is a function of actual motor speed, function generator means having an output voltage-frequency characteristic simulating a torque-speed characteristic of an internal representing actual motor speed to the input of said function generator means, means for developing a torque signal which is a function of the actual output torque of said motor, means for comparing said torque signal and a signal which is a function of the output of said function generator means to produce an error signal that represents the difference between actual and desired torque, and means applying said error signal to said voltage control means to thereby control the voltage applied to said motor winding as a function of said error signal.

4. A motor control system for an induction motor for causing the motor to operate with a predetermined torque-speed characteristic comprising, an induction motor having a polyphase winding, a source of polyphase alternating current, a three-phase full-wave bridge rectifier circuit having AC input terminals and direct current output terminals comprised of a plurality of controlled rectifiers and a plurality of diodes, means connecting said AC input terminals of said bridge circuit to said source of said polyphase alternating current, an inverter comprised of a plurality of switching devices having a pair of direct current input terminals and a plurality of AC output terminals, means connecting the direct current output terminals of said bridge circuit with the direct current input terminals of said inverter, means connecting said polyphase winding of said induction motor with said AC output terminals of said inverter, means developing an electrical signal which is a function of actual induction motor speed, means adding said signal to a slip frequency signal to provide an output singal that controls the switching frequency of the inverter such that said motor is operated at a substantially constant slip frequency, means developing an alternating voltage the frequency of which is a function of actual motor speed, an active filter circuit having an output voltage-frequency characteristic corresponding to a desired torque-speed characteristic to be maintained by said motor, means applying said alternating voltage representing actual motor speed to the input of said filter, means developing an electrical signal which is a function of the actual output torque of said motor, means for comparing said torque signal with a signal which is a function of the output voltage of said filter circuit whereby the actual and desired torque are compared, said last named means developing an error voltage when there is a difference in the actual and desired output torque of said motor, and means for controlling the firing angle of said controlled rectifiers of said bridge circuit in response to said error signal when said error signal exists.

5. A motor control system for an induction motor for causing the motor to operate with a predetermined torque-speed characteristic comprising, an induction motor having a polyphase winding, a source of polyphase alternating current, a three-phase full-wave bridge rectifier circuit having AC input terminals and direct current output terminals comprised of a plurality of controlled rectifiers and a plurality of diodes, means connecting the AC input terminals of said bridge circuit to said source of said polyphase alternating current, an inverter comprised of a plurality of switching devices having a pair of direct current input terminals and a plurality of AC output terminals, means connecting the direct current output terminals of said bridge circuit with the direct current input terminals of said inverter, means connecting said polyphase winding of said induction motor with said AC output terminals of said inverter, means developing an electrical signal which is a function of actual induction motor speed, means adding said signal to a slip frequency signal to provide an output signal that controls the switching frequency of the inverter such that said motor is operated at a substantially constant slip frequency, means developing an alternating voltage the frequency of which is a function of actual motor speed, an active filter circuit having an output voltage-frequency chracteristic corresponding to a desired torque-speed characteristic to be maintained by said motor, means applying said alternating voltage representing actual motor speed to the input of said filter, means developing an electrical signal which is a function of the actual output torque of said motor, means for comparing said torque signal with a signal which is a function of the output voltage of said filter circuit whereby the actual and desired torque are compared, said last named means developing an error voltage when there is a difference in the actual and desired output torque of said motor, means for controlling the firing angle of said controlled rectifiers of said bridge circuit in response to said error signal when said error signal exists, and means for at times operating said induction motor in a braking mode, said last named means including means for connecting the phase windings of said motor in series and to the output of said bridge rectifier.

* * * * *

PO-1050
(5/69)

UNITED STATES PATENT OFFICE
CERTIFICATE OF CORRECTION

Patent No. 3,753,064    Dated August 14, 1973

Inventor(s) Paul D. Agarwal et al.

It is certified that error appears in the above-identified patent and that said Letters Patent are hereby corrected as shown below:

```
Column  6, line 34, after "output" insert -- voltage --.
Column  7, line 27, "fasion" should be -- fashion --.
Column  8, line 54  delete "are" and substitute -- were --.
Column 10, line 12, delete "24" and substitute -- 224 --;
           line 30, delete "29" and substitute -- 28 --.
Column 11, line 12, "transcucer" should be transducer --;
           line 28, "aid" should be -- said --.
Column 12, line 31, after "internal" insert -- combustion
                    engine, means for applying said alter-
                    nating voltage --;
           line 50, delete "said" (first occurrence) and
                    substitute -- the --.
```

Signed and sealed this 18th day of June 1974.

(SEAL)
Attest:

EDWARD M. FLETCHER, JR.
Attesting Officer

C. MARSHALL DANN
Commissioner of Patents